United States Patent
Molina et al.

(10) Patent No.: US 8,670,479 B2
(45) Date of Patent: Mar. 11, 2014

(54) POWER LINE COMMUNICATION SYSTEM

(75) Inventors: Jose Abad Molina, Rincon de la Victoria (ES); Jonathan Ephraim David Hurwitz, Edinburgh (GB)

(73) Assignee: Broadcom Corporation, Irvine, CA (US)

( * ) Notice: Subject to any disclaimer, the term of this patent is extended or adjusted under 35 U.S.C. 154(b) by 421 days.

(21) Appl. No.: 12/996,208

(22) PCT Filed: Jun. 12, 2009

(86) PCT No.: PCT/EP2009/057284
§ 371 (c)(1),
(2), (4) Date: Mar. 16, 2011

(87) PCT Pub. No.: WO2009/150224
PCT Pub. Date: Dec. 17, 2009

(65) Prior Publication Data
US 2011/0164670 A1 Jul. 7, 2011

(30) Foreign Application Priority Data
Jun. 13, 2008 (GB) .................................. 0810855.7

(51) Int. Cl.
*H04B 3/46* (2006.01)
*H04B 17/00* (2006.01)

(52) U.S. Cl.
USPC ...................................... 375/225; 455/67.13

(58) Field of Classification Search
USPC ......... 375/219, 220, 224, 225, 227; 455/13.4, 455/14, 501, 67.11, 67.13, 70
See application file for complete search history.

(56) References Cited

U.S. PATENT DOCUMENTS

| | | | |
|---|---|---|---|
| 7,203,508 B2 * | 4/2007 | Ohkubo et al. | 455/510 |
| 7,440,399 B2 * | 10/2008 | Julian et al. | 370/230 |
| 8,031,686 B2 * | 10/2011 | Li et al. | 370/342 |
| 2001/0021231 A1 * | 9/2001 | Kroeger et al. | 375/316 |

FOREIGN PATENT DOCUMENTS

EP 1770870 A1 4/2007
WO WO-2008/005507 A2 1/2008

OTHER PUBLICATIONS

De Iulis, M., "International Search Report", for PCT/EP2009/057284 as mailed Aug. 28, 2009, 3 pages.

* cited by examiner

*Primary Examiner* — Young T. Tse
(74) *Attorney, Agent, or Firm* — Garlick & Markison; Holly L. Rudnick

(57) ABSTRACT

The present invention relates to a communication system comprising a transmitter and receiver in communication for transmitting signals through one or more communications channels, wherein at least one of the transmitter and the receiver each comprise a quality measure, which contributes to an overall quality measure for the system and wherein the or each communications channel comprises a plurality of sub-bands between at least two nodes, wherein the plurality of sub-bands each having a specific maximum power spectral densities (PSDs) and wherein one or more sub-bands between the transmitter and the receiver are identified as having a higher maximum PSD than other sub-bands and wherein the PSD of the one or more identified sub-bands is reduced in a predetermined manner to thereby increase the overall quality measure for the system.

20 Claims, 7 Drawing Sheets

POWER LINE COMMUNICATION SYSTEM

FIELD OF THE INVENTION

The present invention relates to a method, system and computer program for improving a communication system; and in particular, a communication system comprising a transmitter and receiver communicating over a plurality of sub-bands of differing power spectral densities.

BACKGROUND OF THE INVENTION

Broadband powerline communication (PLC) is a technology that modulates a radio signal with data and transmits the signal on existing electricity powerlines in a band of frequencies that are not used for supplying electricity. In particular, current PLC systems transmit signals at relatively low frequencies (i.e. <30 MHz). High maximum throughput is achieved by employing modulations with a large number of bits per second per carrier per hertz (i.e. bpc/Hz) in the PLC modulation schemes. These systems typically define maximum and useable bps/Hz for each carrier. The transmitter and receiver are often capable of negotiating the used bpc/Hz for each carrier according to a received Signal to Noise Ratio (SNR) so as to optimize the channel capacity between any two nodes (within the limits of the defined modulation parameters). The available channel capacity between any two nodes of the powerline differs with the frequency of a transmitted signal (because of different attenuations, effects of multi-path delays and clock accuracy and noise). The available dynamic range of the implementation and the defined parameters of the modulation in the communication scheme also limit the achieved throughput.

The Federal Communications Commission (FCC) establishes limitations on the conducted and radiated emissions from electronic devices. Conducted emissions are currents that are passed out through a power cord and placed on a common power net, where they may radiate more efficiently because of the larger expanse of this antenna, thereby interfering with other devices. The frequency range for conducting emissions is 150 KHz to 30 MHz. Radiated emissions are electric and magnetic fields radiated by a device, wherein these emissions may be received by other electronic devices causing interference therewith. The frequency range for radiated emissions extends from 30 MHz to 40 GHz. There are other regulations in different regions, some specifically for powerline and some for more general applications and some set by different regulatory bodies.

In practice, power lines are neither shielded nor well-balanced. Thus, some of the RF energy they carry is radiated there from. This RF "leakage" can interfere with licensed radio services. Thus, PLC operators are often required to attenuate or "notch" PLC signals in frequency bands where licensed services are in nearby use. Furthermore, some of the regulations and standards require the injected power spectral density (PSD) of the radio signal in a PLC system to be below approximately −80 dbm/Hz in these notches and above 30 MHz, even through a significantly higher (e.g. up to −50 dBm/Hz) PSD can be injected outside the notches and/or below 30 MHz.

For simplicity, the term "notch" refers to a frequency band where the energy level of a PLC signal has been deliberately reduced to prevent interference with other users of the spectrum. The term "sub-band" refers to a frequency band where a PLC signal characteristic differs (e.g. in power level or directionality) from those in the rest of the PLC signal's bandwidth. The term "coverage" refers to the maximum distance between two nodes at which data transmitted there between is still detectable. In PLC it also refers to the percentage of node pairs that can communicate, to a given minimum performance. Similarly, the term "throughput" refers to the rate at which nodes send or receive data on a network. Coverage in a network is generally dominated by a maximum injected power, as node pairs that have difficulty communicating, do so primarily because of channel attenuation and receiver noise. However there are many node pairs where the throughput between them is not limited by the channel, but by the implementation of the communication system.

In future PLC systems (such as those being defined by IEEE P1901 and ITU-T Ghn), there is a desire to increase throughput, whilst maintaining or improving coverage, keeping a reasonable implementation cost and meeting regulatory requirements. One approach to increase throughput, is to increase the bandwidth of the single band starting below 30 MHz to make it go above 30 MHz. However, the severe stepped PSD (difference of ~30 dB) imposed by the above regulations, makes it difficult to use a communication band extending above and below 30 MHz, at a reasonable implementation cost, because the dynamic range of both the transmitter and receiver must be capable of handling the step in signal power.

The PSD step between the largest and smallest sub-bands within a band and the defined maximum bpc/Hz for each of the carriers largely defines the dynamic range requirements of the transmitter and receiver. The PSD step further drives the level of quantization, noise and linearity required to maintain signal integrity. Linearity, noise and quantization requirements significantly affect the implementation costs of the analog and digital sections of a modem, and lead to practical limits which may make it too expensive or impossible to implement the same maximum bps/Hz in the sub-bands with a lower PSD.

In principle, any PLC system may support multiple carriers operating in separate sub-bands operating with different injected power levels. It may also use only a subset of the carriers to communicate with nodes using only a part of the communication band (e.g. legacy systems extending over 1.8 Mhz to 30 MHz). It may also be part of a system where another independent band is used in parallel in the same medium or across another medium.

SUMMARY OF THE INVENTION

According to a first aspect of the invention, there is provided a communication system comprising a transmitter and receiver in communication for transmitting signals through one or more communications channels, wherein at least one of the transmitter and the receiver each comprise a quality measure, which contributes to an overall quality measure for the system and wherein each communications channel comprises a plurality of sub-bands between at least two nodes, wherein the plurality of sub-bands each having a specific maximum power spectral density (PSD) and wherein one or more sub-bands between the transmitter and the receiver are identified as having a higher maximum PSD than other sub-bands and wherein the PSD of the one or more identified sub-bands is reduced in a predetermined manner to thereby increase the overall quality measure for the system.

According to a second aspect of the invention, there is provided a method for a communication system comprising a transmitter and receiver in a communication channel, wherein at least one of the transmitter and the receiver comprise a quality measure, which contributes to an overall quality measure for the system and wherein each communications channel comprises a plurality of sub-bands between at least two nodes, wherein the plurality of sub-bands each has a specific maximum power spectral density (PSD), the method comprises the steps of identifying one or more sub-bands having a higher PSD than other sub-bands between the transmitter and the receiver and reducing the PSD of the one or more identified sub-bands in a predetermined manner to thereby increase the overall quality measure for the system.

According to a third aspect of the invention, there is provided a computer program product stored in a medium readable by a computer machine, the computer program product tangibly embodying readable program means by causing the computer to perform the method of the second aspect.

According to an alternative aspect of the invention, there is provided a method of improving a communication system comprising a transmitter and receiver communicating over a plurality of sub-bands of differing maximum power spectral densities, the method comprising the steps of checking a quality of one or more signals received by the receiver in a one or more of the sub-bands, identifying the one or more signals within the one or more sub-bands which are received best by the receiver, communicating this information to the transmitter, reducing the power at which at least some of the identified signal(s) in the identified sub-band(s) is transmitted by the transmitter, checking whether the receiver is still receiving the identified signal(s) in the identified sub-band(s) without substantial degradation, checking whether the quality of the other signals in at least some of the remaining sub-bands have substantially improved, altering a bit loading of the signals in substantially all of the sub-bands according to the quality of the received signals and continuing to monitor and alter the power at which the identified signal(s) in the identified sub-band(s) are transmitted by the transmitter until an overall quality of the signals received by the receiver in substantially all of the sub-bands, is optimized to increase an available throughput.

The present invention can be applied to only some of the communications between two nodes. The invention can be applied to communications between some nodes of a network and not others. The invention can be applied to communications between some nodes of the network, while other communications to other nodes use a subset of the available signals. The invention can be applied to communications between some nodes of the network, while other communications use a different band to communicate in parallel. The invention can be applied to communications between some nodes of the network, while other communications use a different medium to communicate in parallel.

BRIEF DESCRIPTION OF THE DRAWINGS

An embodiment of the invention is herein described, by way of example, with reference to the accompanying Figures, in which.

DETAILED DESCRIPTION

Figure 1:
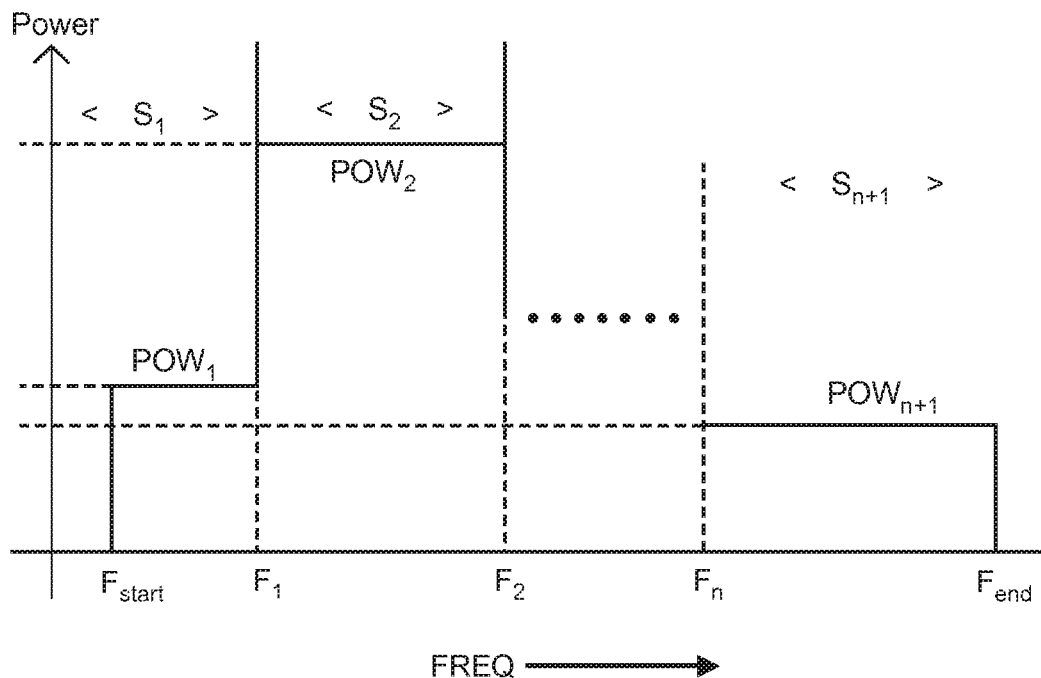
FIG. 1 is an exemplary power spectral density profile of a plurality of communication sub-bands.

FIG. 1 represents a communication system with a communication band (extending from $f_{start}$ to $f_{end}$) divided into several substantially consecutive sub-bands (i.e. sub-band $S_1$ extends from $f_{start}$ to $f_1$, sub-band $S_2$ extends from $f_1$ to $f_2$, sub-band$_{Sn+1}$ extends from $f_n$ to $f_{end}$). A communication device may use one of the sub-bands to communicate with another type of device (e.g. a device using band from $f_{start}$ to $f_{end}$ could communicate with a device that only uses sub-band from $f_1$ to $f_2$). As previously discussed, each of the sub-bands has a (regulatory and/or technical) limitation on the maximum Power Spectral Density that can be injected at those frequencies. In particular, in the present example, sub-band 51 can support an injected power spectral density of $POW_1$. Similarly, sub-bands $S_2$ and $S_3$ can respectively support injected power spectral densities of $POW_2$ and $POW_3$.

Figure 2:
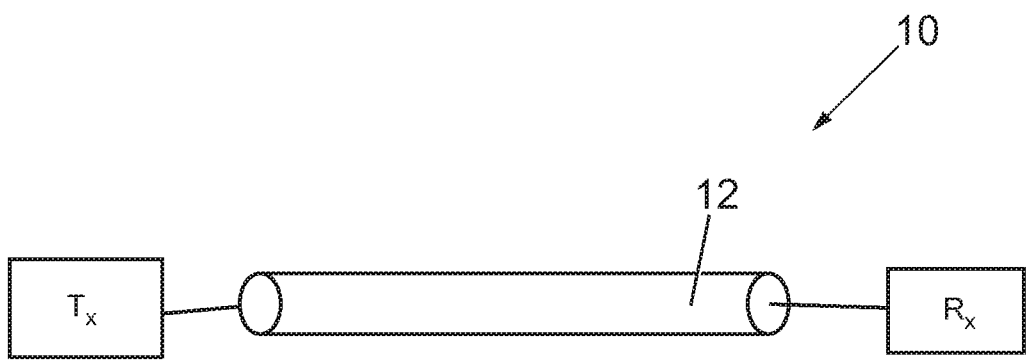
FIG. 2 is a block diagram of a typical communications system.

Referring to FIG. 2, a communication system 10 typically comprises a transmitter device ($T_x$) in communication with a receiver device ($R_x$) through a communications channel 12. Traditional thinking (based on Shannon's law) teaches that signals should be transmitted at maximum power to maximize the throughput. However, this approach increases the noise from the transmitter.

In particular, the signal to noise ratio of a receiver ($R_x$) can be expressed by the following equation, wherein Power ($T_x$) refers to the power at which a signal is transmitted from the transmitter ($T_x$), Attenuation refers to the attenuation of the communications channel 12; and Noise ($R_x$) and Noise ($T_x$) respectively refer to the noise of the receiver ($R_x$) and transmitter ($T_x$).

$$SNR(Rx) = \frac{Power(T_x) - Attenuation}{Noise(R_x) + (Noise(T_x) - Attenuation)}$$

This is a first order expression, which demonstrates that in poor channels the injected power (Power($T_x$)), the channel attenuation and the noise at the receiver (Noise($R_x$)) will largely determine the signal to noise ratio of the receiver ($R_x$). This same first order expression also demonstrates that in good channels where the attenuation is low and the receiver noise (Noise ($R_x$)) is not dominant, the signal to noise ratio of the receiver ($R_x$) is effectively limited by the signal to noise ratio of the transmitter ($T_x$). Thus, transmitter noise can effectively impose a noise floor on a receiver, thereby limiting the dynamic range of the receiver. Transmitter noise (e.g. from clipping, quantization errors, analogue non-linearities and distortion) is predominantly white noise, and is measurable across all of the transmission sub-bands.

Figure 3:
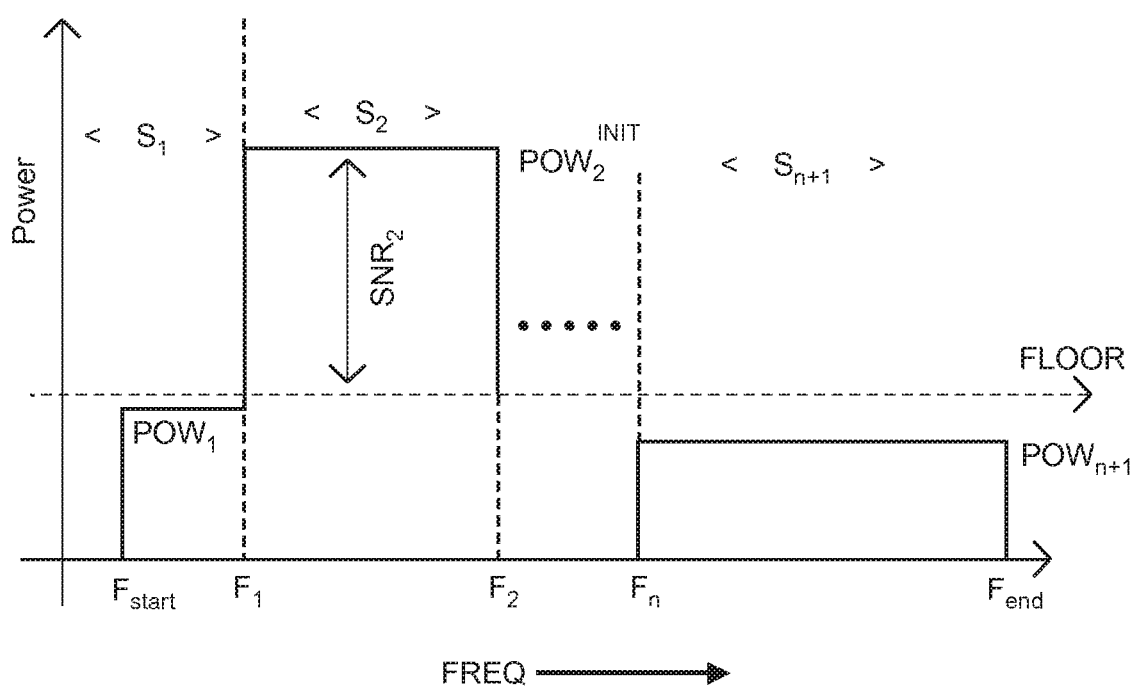
FIG. 3 is the power spectral density profile of FIG. 1 with a noise floor imposed thereon.

Using the previous example and referring to FIG. 3, it can be seen that the noise from the high-power signal in sub-band $S_2$ effectively spills out over the rest of the sub-bands. In particular, the noise from the high-power signal in sub-band $S_2$ forms the dominant component of the overall noise floor across the rest of the sub-bands. The power signal densities ($POW_1$ and $POW_{n+1}$) of sub-bands $S_1$ and $S_{n+1}$ are below the noise floor; and are not detectable there above. In contrast, the power signal density ($POW_2$) in sub-band $S_2$ is considerably larger than the noise floor and has an effective SNR of $SNR_2$. Thus, generalizing from this example, it can be seen that various sub-bands may have considerably different effective SNRs. Furthermore, in some cases, a sub-band may not be suitable for communication purposes (e.g. a sub-band with an effective SNR of 3 dB, is not sufficient quality for communication in an OFDM system with QPSK as a lowest constellation).

In principle it is possible to drop the noise floor in sub-band $S_{n+1}$ whilst maintaining the same high-powered transmission in sub-band $S_2$. However, this would be very expensive because of the need for extensive gates and problems with the linearity of the receiver's analogue to digital converter.

The preferred embodiment takes a counter-intuitive approach to this problem by reducing the power level injected in the one or more highest-powered sub-bands, to improve the total SNR of the overall communication system (when the quality of the channel allows this improvement). In particular, reducing the maximum power spectral density of a band causes quantization noise to be reduced in approximately the same quantity. Similarly, reducing the maximum power spectral density of a band causes analogue distortion to be reduced by a factor greater or equal to the reduction in PSD.

Figure 4:
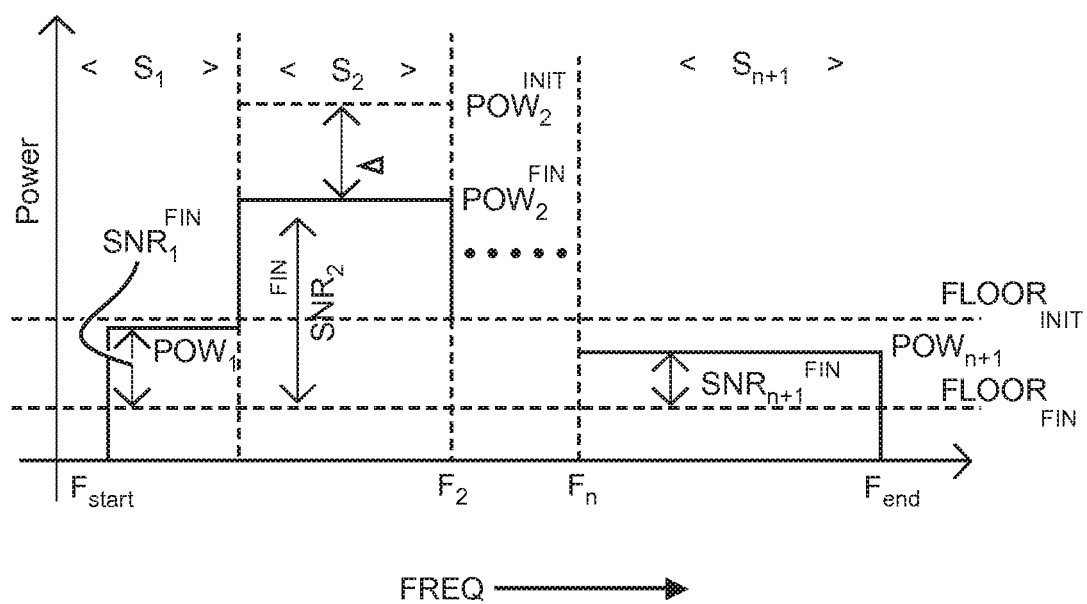
FIG. 4 is the power spectral density profile of FIG. 3 with a change in a noise floor resulting from the implementation of the preferred embodiment depicted therein.

Referring to FIG. 4, reducing the power spectral density of the highest power spectral density sub-band, namely sub-band $S_2$ (by a value $\Delta$) from its maximum allowable value ($POW_2^{init}$) to a lower value ($POW_2^{fin}$) has the effect of lowering the noise floor (from $Floor_{init}$ to $Floor_{fin}$) across all frequencies of the transmitter. Since the power spectral densities of sub-bands $S_1$ and $S_{n+1}$ are now larger than the reduced noise floor $Floor_{fin}$, the new signal to noise ratios ($SNR_1^{fin}$ new and $SNR_{n+1}^{fin}$ new) of these sub-bands are considerably improved. Furthermore, the signal to noise ratio of the sub-band $S_2$ is still very good. Thus, the preferred embodiment implements a trade-off between the signal to noise ratio needed in the sub-band(s) with the highest power spectral density and the signal to noise ratio in the sub-bands with the lowest power spectral density, to achieve an optimal throughput from the system.

The approach adopted in the preferred embodiment is the inverse of a traditional power-shaping technique, which typically adds power to a signal. However, as discussed above, because of inter alia FCC regulations, the preferred embodiment operates in an environment wherein it is not possible to add power. Instead, the preferred embodiment operates by effectively reducing power in a first part of a band to reduce the noise floor and improve performance in another part of the band. However, this runs counter to the accepted teaching of increasing power to increase throughput.

Example Implementation

Figure 5:
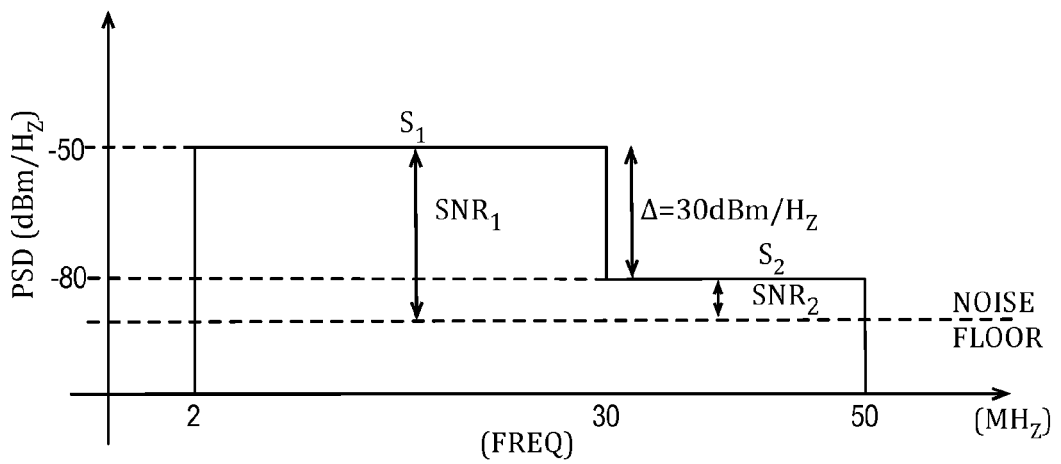
FIG. 5 is a further example of a power spectral density profile of a communication system comprising two sub-bands.

Referring to FIG. 5, take for example, a wired system operating over a frequency range of 0 to 50 MHz. More particularly, let the communication system employ to sub-bands ($S_1$ and $S_2$), the first of which extends over the frequency range 0 to 30 MHz and the other sub-band extending from 30 to 50 MHz. Current FCC regulations prescribe that the maximum allowed power spectral density in the 0 to 30 MHz frequency range is −50 dBm/Hz.

Similarly, the maximum allowed power spectral density in the 30 to 50 MHz frequency range is −80 dBm/Hz.

Let the communication system use OFDM with a maximum constellation size of 1024 QAM or 4096 QAM. Furthermore, let the communication system comprise devices using the complete band from 0 to 50 (e.g. P1901 devices) and other devices using only the sub-band from 0 to 30 (e.g. HPAV devices). The large (i.e. 30 dB) difference between the allowable power spectral densities in the two sub-bands, makes digital quantization (and maintaining linearity of the analogue blocks) particularly difficult. The noise floor resulting from the higher power spectral density sub-band (i.e. sub-band $S_1$) means that the signal to noise ratio in the sub-band from 30 to 50 MHz is lower than that needed for maximum performance (i.e. for 1024 QAM a signal to noise ratio of at least 27 dB is required).

The preferred embodiment finds an optimum point at which the signal to noise ratio in sub-band $S_2$ is almost maximum but the signal to noise ratio in sub-band $S_1$ is still good. The preferred embodiment finds this optimal point in a manner that maximizes the aggregated throughput of both sub-bands. For example, let quantization noise be 40 dB. Similarly, let analogue distortion be 35 dB. Thus, the total noise is approximately 34 dB.

However, it will be recalled that the second sub-band ($S_2$) power is 30 dB below that of the first sub-band ($S_1$). Further, let the channel provide flat noise at a PSD of −100 dBm/Hz, i.e. 20 dB under the second sub-band ($S_2$) power level (i.e. at 50 dB in the first sub-band ($S_1$) and 20 dB in the second sub-band ($S_2$)). Thus, the signal to noise ratio in the first sub-band ($S_1$) is 34 dB and in the second sub-band ($S_2$) is 4 dB.

For the present example, let the required signal to noise ratio for maximum performance of a 1024 QAM (i.e. approximately 3 dB less is required each time we go to the previous constellation size, with one bit less) be 28 dB. Let the system also have all possible constellations from BPSK to 1024 QAM in one-bit steps.

Figure 6:
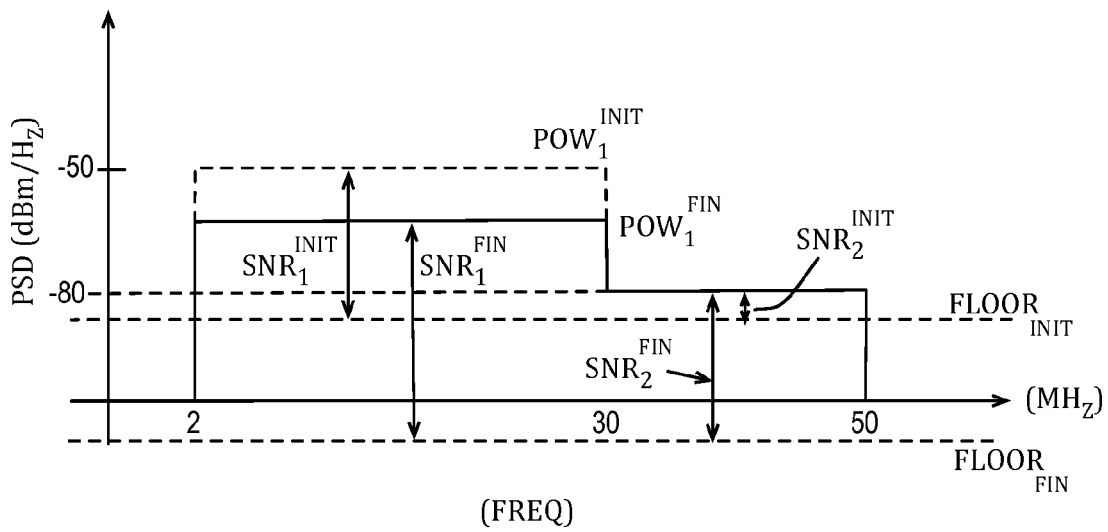
FIG. 6 is a copy of the power spectral density profile of FIG. 5 with the effect of implementing the method of the preferred embodiment depicted thereon.

In the first sub-band ($S_1$) maximum throughput (10 bits per carrier from 0 to 30 MHz) is achieved. However, in the second sub-band ($S_2$) no throughput (0 bits per carrier from 30 to 50 MHz) is achieved. Thus, the total average is 10*3/5+0*2/5=6 bits per carrier across the whole band. Now, as shown in FIG. 6, let the power spectral density in the first sub-band ($S_1$) be reduced by 10 dB (so the new channel power spectral density is −60 dBm/Hz).

Further, let this power reduction lead to a reduction in distortion noise by 10 dB (because it is non-linear). In the first sub-band ($S_1$), the quantization noise is 40 dB. Similarly, the analogue distortion is 45 dB. Thus, the total signal to noise ratio is now 37 dB. In the second sub-band ($S_2$), the quantization noise is 40−30+10=20 dB below the signal.

Similarly, the analogue distortion is 45−30+10=25 dB below the signal. The channel noise power spectral density is still at −100 dBm/Hz which is still 20 dB below the injected power in this sub-band of −80 dBm/Hz. Thus, the total signal to noise ratio in ($S_2$) is 17 dB. Thus, the throughput could be: 10 bits per carrier in the first sub-band ($S_1$) and 6 bits per carrier in the second sub-band ($S_2$). This leads to an average of 10*3/5+6*2/5=42/5=8.4 bits per carrier across the whole band which is an improvement.

Figure 7:
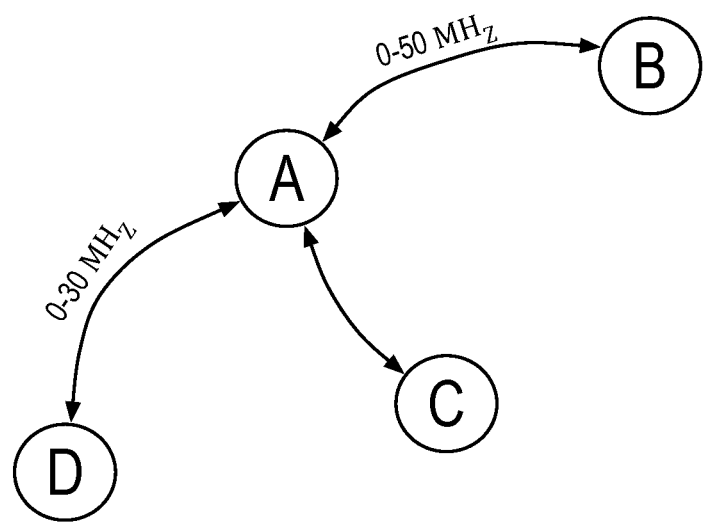
FIG. 7 is a block diagram of a network adapted to implement the method of the preferred embodiment.

Referring to FIG. 7, consider a network comprising a node A in communication with a plurality of nodes B, C and D. Different types of messages (e.g. broadcast, multicast frames, control messages, streaming video, text messages etc.) can be communicated on the network. The method of the preferred embodiment is adaptable to the different types of messages. In particular, it may be desirable for some messages (e.g. broadcast packets or control messages) to be transmitted at maximum power (rather than the above-mentioned optimal power with respect to other sub-bands) as they have low data content.

Furthermore, the method of the preferred embodiment is adaptable so that it need not be applied to all of the nodes in a network. In particular, the method of the preferred embodiment may be used to optimize communications between node A and node B, whereas, communications between node A and node C may be conducted in the traditional (maximal power) manner.

Furthermore, the preferred embodiment is adaptable to accommodate different nodes on the network communicating over different frequencies and different number of carriers. For example, node A may communicate with:

node B over the frequency range 0 to 50 MHz (with the above-mentioned stepped power spectral density profile); and node D over frequency range 0 to 30 MHz (at a single power spectral density).

Furthermore, the method of the preferred embodiment may not be uniformly implemented in both communication directions between nodes in the network. In particular, it is possible that the noise floor may differ between the two communication directions between two nodes, even if the attenuation of the channel between the nodes remains the same.

It will also be appreciated that the preferred embodiment may not be applied uniformly across all of a given sub-band, because the sub-band may be divided into further sub-bands therein even down to the individual carriers. In this case, the carriers on these further sub-bands are negotiated separately. More generally, it will be appreciated that not all of the carriers in the 'sub-band' need to be have their power spectral densities reduced in order to improve the signal to noise ratios in the other sub-bands. In other words, some carriers could be transmitted with more power than others, based on their respective signal to noise ratios, in an effort to maximize the throughput on every carrier in all of the bands.

Thus, at a network level, the method of the preferred embodiment may be implemented in a local or co-ordinated approach. In the local approach, at each communication link, a transmitter decides the power that must be injected into the link (i.e. the power at which a message must be communicated across the communication link) depending on the type of frame being sent, the channel conditions of the communications link and the number of sub-bands the receiver uses. The local approach could also be implemented by the receiver requesting a certain power spectral density profile from the transmitter. In the co-ordinated approach, a master of the network decides the channel allocation for each node and at the same time the power spectral density that must be used by that node (to this end, the master needs knowledge about every type of device, every channel condition and the type of frames to be sent).

Figure 8:
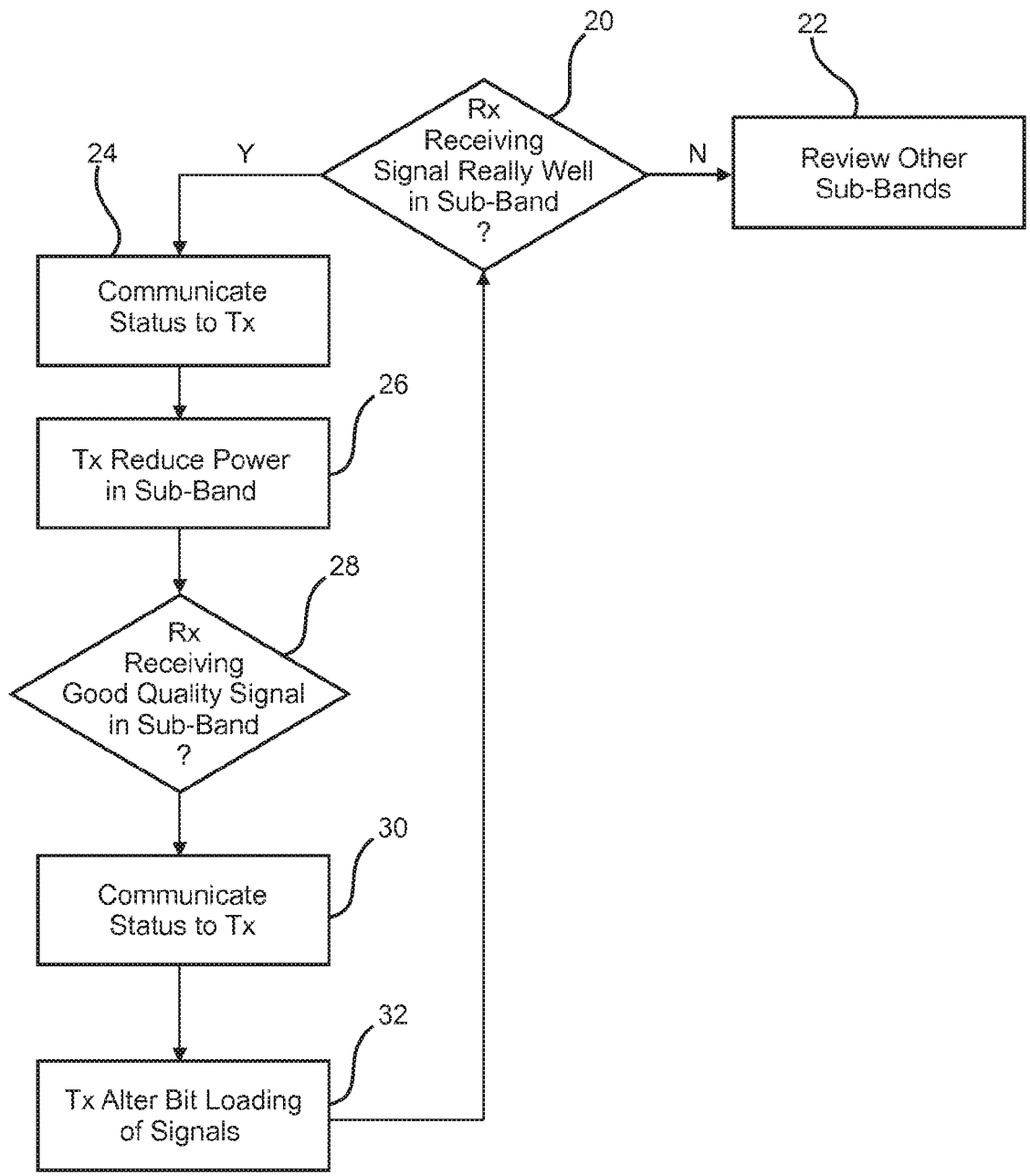
FIG. 8 is a flowchart of the method of the preferred embodiment.

However, regardless of whether a local or co-ordinated approach is used at the network level, fundamentally, the method of the preferred embodiment is based on a negotiation process between the receiver and the transmitter. In particular, referring to FIG. 8, in a first step, a receiver checks 20 whether it is receiving a high quality signal (i.e. with strong power and low noise) in a particular sub-band. If the receiver is not receiving a high quality signal in a given sub-band, the receiver reviews 22 the rest of the sub-bands. If, in contrast, the receiver is receiving a particularly high quality signal in a given sub-band, this is taken to mean that the signal is being transmitted with excess power and the power of the signal in that sub-band can be reduced. The receiver communicates 24 this information to the transmitter. As a result, the transmitter reduces 26 the power at which a signal is injected in the identified sub-band.

The receiver checks 28 again to determine if it is still receiving a good quality signal in the identified sub-band. The receiver also checks whether the quality of the signals received in the other sub-bands has improved. The receiver communicates 30 the quality information to the transmitter, which alters 32 the bit-loading of the signals in the sub-bands in accordance with the quality information from the receiver.

The receiver and transmitter continue to monitor and alter the power at which the identified signal(s) in the identified sub-band(s) are transmitted until the overall quality of the signals received by the receiver, is optimized to increase the available throughput.

Figure 9:
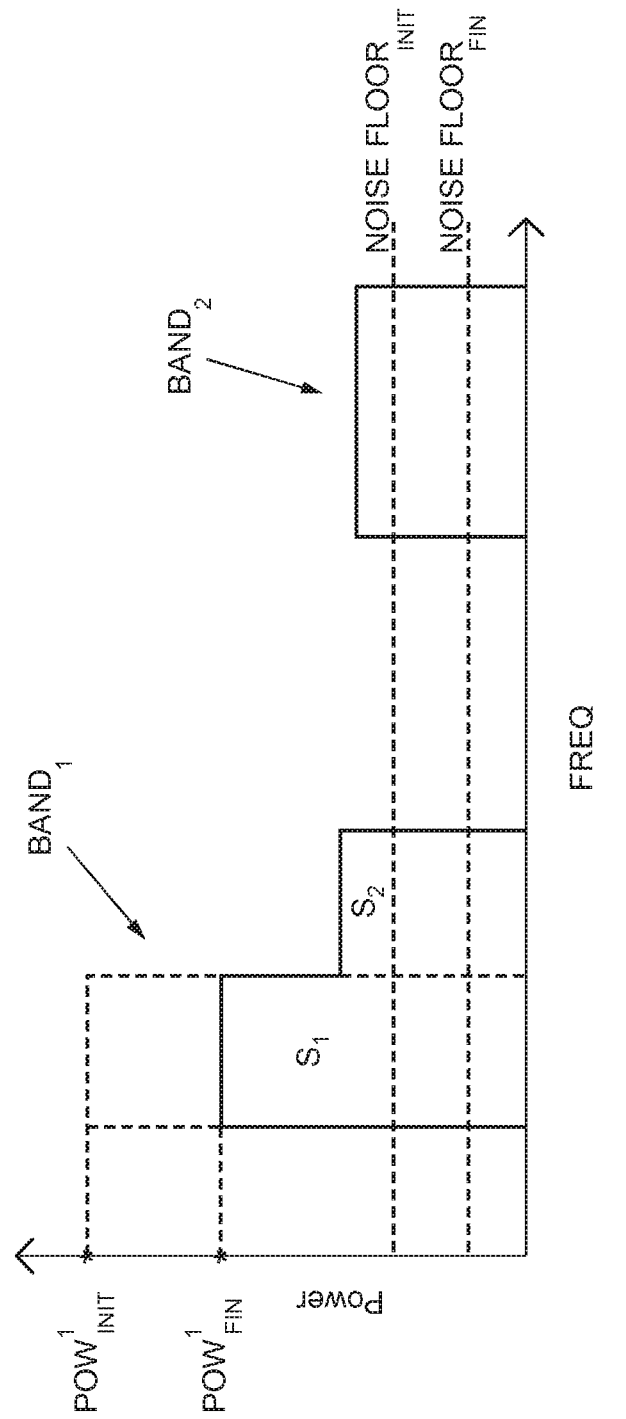
FIG. 9 is a power spectral density profile of a communication system employing two separate communication bands, showing the implementation of the method of the preferred embodiment to a sub-band in one of the communication bands.

On another note, and referring to FIG. 9, it will be appreciated that the method of the preferred embodiment is also applicable in a communication environment comprising two separate and distinct communication bands (i.e. $Band_1$ and $Band_2$), wherein the first band ($Band_1$) comprises two sub-bands ($S_1$ and $S_2$) in which signals are injected at different powers. More particularly, assume sub-band $S_1$ has a higher power spectral density (i.e. $POW_{init}^1$) than sub-band $S_2$, wherein the noise associated with the higher power spectral density (i.e. $POW_{init}^1$) of the first sub-band $S_1$ effectively establishes and dominates the noise floor ($Noise\_Floor_{init}$) for the whole communication system. As before, the method of the preferred embodiment comprises the step of reducing the power spectral density of the first sub-band $S_1$ to a new power spectral density ($POW_{fin}^1$) and thereby reducing the overall noise floor (to $Noise\_Floor_{fin}$) for the whole communication system.

Current PLC systems (e.g. those defined within Homeplug, HDPLC and Universal Powerline Association (UPA)), use multi-carrier OFDM based modulations. However, the preferred embodiment does not preclude the use or combination with other modulation or access schemes.

Similarly, it will be appreciated that whilst the preferred embodiment has been described within the context of a powerline communication system, this particular context has been provided for explanatory purposes only. In particular, the skilled person will understand that the preferred embodiment is in no way limited to this particular context. Instead, the preferred embodiment is equally applicable to any other situation in which signals are communicated in sub-bands with widely differing power spectral densities.

Alterations and modifications may be made to the above without departing from the scope of the invention.

The invention claimed is:

1. A communication system comprising:
a plurality of nodes, one of the plurality of nodes including a transmitter and another of the plurality of nodes including a receiver, the transmitter configured to transmit signals through a communications channel to the receiver;
wherein a channel quality measure of the communications channel contributes to an overall quality measure for the system,
wherein the communications channel comprises a plurality of sub-bands, wherein the plurality of sub-bands each has a specific maximum power spectral density (PSD),
wherein one or more identified sub-bands of the plurality of sub-bands between the transmitter and the receiver are identified as having a higher maximum PSD than other sub-bands, and
wherein the PSD of the one or more identified sub-bands is reduced in a predetermined manner to thereby increase the channel quality measure of the communications channel and the overall quality measure for the system.

2. The communication system of claim 1, wherein a plurality of sub-band quality measures, each associated with a sub-band of the plurality of sub-bands, are transmitted from the receiver to the transmitter to indicate that the PSD can be reduced for the one or more identified sub-bands.

3. The communication system of claim 2, wherein the sub-band quality measures in monitored sub-bands of the plurality of sub-bands are iteratively monitored to determine respective quality measure changes and a bit loading of the signals in the monitored sub-bands is adjusted based on the quality measure changes until the channel quality measure is optimized to thereby increase an available throughput.

4. The communication system of claim 2, wherein after reducing the PSD, the sub-band quality measure of the one or more identified sub-bands is analyzed to determine any change in the sub-band quality measure of the one or more identified sub-bands.

5. The communication system of claim 2, wherein after reducing the PSD, the sub-band quality measure of other sub-bands is analyzed to determine any change in the sub-band quality measure of the other sub-bands.

6. The communication system of claim 1, wherein the PSD of the one or more identified sub-bands is reduced by an amount determined based on predetermined criteria of the signals, the communications channel and the plurality of sub-bands.

7. The communication system of claim 1, wherein the receiver determines and requests, from the transmitter, a PSD profile indicating the PSD for the one or more identified sub-bands.

8. The communication system of claim 1, wherein a respective communications channel and an associated PSD profile indicating the PSD for one or more sub-bands of the respective communications channel are allocated for each node of the plurality of nodes.

9. A method for a communication system comprising:
transmitting signals by a transmitter through a communications channel to a receiver;
wherein a channel quality measure of the communications channel contributes to an overall quality measure for the system,
wherein the communications channel comprises a plurality of sub-bands, and
wherein the plurality of sub-bands each has a specific maximum power spectral density (PSD);
identifying one or more sub-bands having a higher PSD than other sub-bands between the transmitter and the receiver; and
reducing the PSD of the one or more identified sub-bands in a predetermined manner to thereby increase the overall quality measure for the system.

10. The method of claim 9, wherein a plurality of sub-band quality measures, each associated with a sub-band of the plurality of sub-bands, are transmitted from the receiver to the transmitter to indicate that the PSD can be reduced for the one or more identified sub-bands.

11. The method of claim 10, wherein the sub-band quality measures in monitored sub-bands of the plurality of sub-bands are iteratively monitored to determine respective quality measure changes and a bit loading of the signals in the monitored sub-bands is adjusted based on the quality measure changes until the channel quality measure is optimized to thereby increase an available throughput.

12. The method of claim 10, wherein after reducing the PSD, the sub-band quality measure of the one or more identified sub-bands is analyzed to determine any change in the sub-band quality measure of the one or more identified sub-bands.

13. The method of claim 10, wherein after reducing the PSD, the sub-band quality measure of other sub-bands is analyzed to determine any change in the sub-band quality measure of the other sub-bands.

14. The method of claim 9, wherein the PSD of the one or more identified sub-bands is reduced by an amount determined based on predetermined criteria of the signals, the communications channel and the plurality of sub-bands.

15. The method of claim 9, wherein the receiver determines and requests, from the transmitter, a predetermined PSD profile indicating the PSD for the one or more sub-bands.

16. The method of claim 9, further comprising:
providing a plurality of nodes, one of the plurality of nodes including the transmitter and another of the plurality of nodes including the receiver,
wherein a respective communications channel and an associated PSD profile indicating the PSD for one or more sub-bands of the respective communications channel are allocated for each node of the plurality of nodes.

17. A communication system, comprising:
a transmitter configured to transmit signals through a communications channel to a receiver;
wherein the communications channel comprises a plurality of sub-bands, each of the plurality of sub-bands having a maximum power spectral density (PSD),
wherein one or more identified sub-bands of the plurality of sub-bands have a higher PSD than remaining sub-bands of the plurality of sub-bands, and
wherein the PSD of the one or more identified sub-bands is reduced to increase a channel quality measure of the communications channel.

18. The communications system of claim 17, wherein the transmitter receives a plurality of quality measures from the receiver, each of the plurality of quality measures being associated with a sub-band of the plurality of sub-bands, the plurality of quality measures indicating that the PSD can be reduced for the one or more identified sub-bands.

19. The communications system of claim 17, wherein the transmitter is further configured to iteratively receive a respective quality measure in at least some of the remaining sub-bands and adjust a bit loading of the signals in substantially all of the sub-bands based on the received quality measures until the channel quality measure is optimized to thereby increase an available throughput.

20. The communications system of claim 17, wherein the PSD of the one or more identified sub-bands is reduced by an amount determined based on predetermined criteria of the signals, the communications channel and the plurality of sub-bands.

* * * * *